United States Patent [19]

Zimmermann et al.

[11] Patent Number: 4,757,464
[45] Date of Patent: Jul. 12, 1988

[54] APPARATUS FOR RECOGNIZING RELATIVE EXTREMA

[75] Inventors: Werner Zimmermann, Pirmasens; Karl-Heinz Hauser, Bruckmühl, both of Fed. Rep. of Germany

[73] Assignee: Messerschmitt-Bölkow-Blohm GmbH, Munich, Fed. Rep. of Germany

[21] Appl. No.: 874,494

[22] Filed: Jun. 16, 1986

[30] Foreign Application Priority Data

Jun. 15, 1985 [DE] Fed. Rep. of Germany ....... 3521610

[51] Int. Cl.⁴ .................... H03K 5/19; G01R 19/30
[52] U.S. Cl. .................................. 364/715; 377/39
[58] Field of Search ............... 364/715; 340/146.2; 328/108, 135; 377/39, 54, 45, 69

[56] References Cited

U.S. PATENT DOCUMENTS

| | | | |
|---|---|---|---|
| 3,924,078 | 12/1975 | Bussey | 364/769 X |
| 3,927,309 | 12/1975 | Fujiwara et al. | 328/135 X |
| 4,216,463 | 8/1980 | Backof, Jr. et al. | 377/45 X |

*Primary Examiner*—Gary V. Harkcom
*Assistant Examiner*—Tan V. Mai
*Attorney, Agent, or Firm*—Kenyon & Kenyon

[57] ABSTRACT

An apparatus for recognizing relative extrema in a dispersive digital data word sequence which includes relatively few, simple component elements specifically including a comparator which generates a positive or zero logic signal depending on the sign of the word comparison between two successive words, a counter operating within a limited numerical range for counting the comparator output signals upward or downward, and a threshold detector responding when a given counter status is exceeded or fallen short of for maximum or minimum indication, and which due to its structurally and operatively simple design ensures real-time processing of scattering data word sequences with a high word frequency, e.g., 500 MHz.

10 Claims, 1 Drawing Sheet

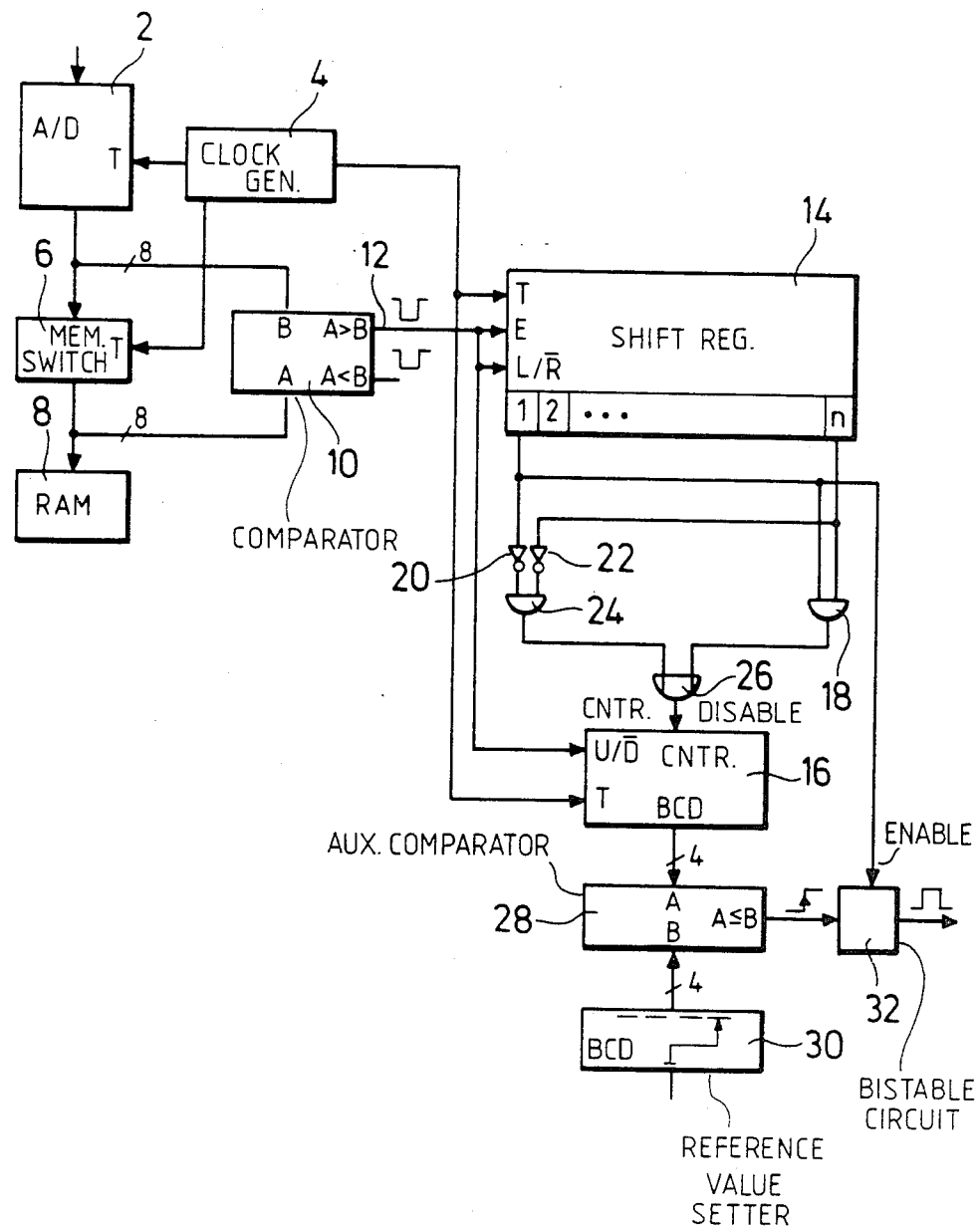

APPARATUS FOR RECOGNIZING RELATIVE EXTREMA

BACKGROUND OF THE INVENTION

The present invention relates to an apparatus for recognizing relative extrema of a dispersive digital data word sequence.

Known devices of this kind, which are able to compensate scatter values in the extrema value recognition of a digital data word sequence, are functionally and structurally complicated and have a correspondingly limited operating speed, so that they are not suitable for real-time processing of word quantities which occur in dense succession, say with a frequency of 500 MHz.

SUMMARY OF THE INVENTION

It is therefore an object of the present invention to provide an apparatus for recognizing relative extrema of a dispersive digital data word sequence which has a greatly simplified construction and extremely high operating speed.

The above and other objects of the present invention are achieved by an apparatus for recognizing relative extrema of a dispersive digital data word sequence, including a comparator which compares each word of the word sequence with the immediately following word and which, depending on the sign of the word comparison, furnishes a positive or a zero logic output signal, an addition register having its input coupled to the comparator output and whose content preferably is increased by one by a positive comparator output signal and decreased by one by a zero comparator output signal within a limited numerical range, and a threshold detector associated with the addition register which responds when a numerical value given within the limited numerical range in the addition register is exceeded or fallen short of and which indicates an extremum.

The apparatus according to the invention ensures with few, simple circuit elements and on the basis of very simple logic operations an extremely rapid extremum recognition with inclusion of scatter values, in that two successive data words are linked in the comparator to form a logic output signal, these logic signals are summed in the following addition register, and by the associated threshold detector display, signals for a maximum or minimum are furnished in dependence on the state of occupation or numerical status in the addition register, with the special feature that the addition register operates only within a limited numerical range and thus forms a kind of time window, and the threshold detector responds only when a given numerical value is exceeded (or fallen short of), which represents the difference of the positive and zero logic signals of the comparator taken into account in the addition register. This ensures an extreme position recognition of high reliability even under inclusion of scatter values, so that the apparatus according to the invention is eminently suitable for cases in which the relative extrema of a dispersive digital data word sequence must be indicated very quickly and reliably at minimum cost of construction.

By designing the addition register as a shift register, a further structural simplification is achieved. The limitation of the numerical range ensures that the threshold detector is again ready to respond for the next extremum indication shortly after the indication of an extreme position, that is, that the numerical value, which when overstepping in one direction triggers an extremum indication, is traversed with certainty in the opposite direction (and without an extremum indication) before the next, similar extreme position, i.e. a maximum or minimum, occurs in the word sequence. By the presetting of a variable numerical value, the response characteristic of the device can be sensitively matched to the respective scatter behavior of the word sequence to be examined, and it can be assured that already few words behind an extreme value, a maximum or minimum indication occurs. The arrangement of a selectively blocked but otherwise conventional digital counter offers another structural simplification, with the reference value settable in a variable manner at an auxiliary comparator again permitting a fine adaptation and shortening of the response time.

To further increase the reliability of indication, a bistable circuit element which blocks an extremum indication in the blocking position is provided on the output side of the threshold detector; it prevents that scatter-related fluctuations in the addition register, which might occur around the given numerical or reference value following an extremum indication, will falsely lead to a second extremum indication.

By a simple alteration of the circuit connection between the comparator and addition register, the device according to the invention can be used either for maximum or for minimum recognition. Selectively, however, it is readily possible also to assign to each of the comparator outputs an addition register as well as a threshold detector, so that the device furnishes a maximum indication on one operation path connected after the common comparator as well as a minimum indication on the second operation path parallel thereto.

Lastly, it is preferable to connect ahead of the comparator an analog/digital converter and a memory switch, so that in a simple manner and with high accuracy also analog signals can be examined for extreme positions.

BRIEF DESCRIPTION OF THE DRAWING

The invention will be explained in greater detail in the following detailed description with reference to the single drawing FIGURE which shows a block diagram of an apparatus for recognizing relative maxima of an analog test signal.

DETAILED DESCRIPTION

With reference now to the drawing, in an analog/digital converter 2, controlled by a clock generator 4, an analog test signal present at the converter input is converted into a digital data word sequence with a conversion frequency which is a multiple of the frequency of the test signal and is, e.g. about 500 MHz. Connected to the converter 2 is a memory switch 6 which is also controlled by the clock generator 4 but operates phase-shifted relative to the converter frequency by 180°. Each word of the word sequence at the output of switch 6 is supplied, on the one hand, to an address memory 8 and on the other hand, to an input A of a comparator 10, while the immediately following word, which is present at the input of the memory switch 6, is connected to the other comparator input B. If the word at input A is larger than the word at input B, the comparator 10 generates at its output 12 a zero logic signal. Otherwise a positive logic signal is generated.

In a likewise clock-controlled shift register 14, connected on the input side to the comparator output 12, the positive and zero comparator output signals are applied to shift register 14 at the A/D conversion frequency in such a way that the shift register content is moved to the right by one position for a negative logic signal and the cleared first shift register position is occupied with logic zero, while for a positive comparator output signal the shift register 14 is moved to the left and the thus cleared last shift register position is occupied positively (with logic one). The shift register 14 operates in a limited numerical range corresponding to the number of shift register positions and forms a kind of time window for the data word sequence, that is, the number of shift register positions is only a fraction of the number of comparator output signals generated during one period of the test signal.

Connected to the comparator output 12 is further a likewise clock-controlled binary counter 16 which counts a positive logic signal upward and a zero logic signal downward. To limit the counting range of counter 16 to the numerical range given by the number of shift register positions, counter 16 is selectively blocked when all shift register positions are occupied identically, that is, either zero (0) or positive (1). For this purpose, the first and last shift register positions are connnected on the one hand, via an AND gate means 18 and secondly, via inverters 20 or 22 and an additional AND gate means 24 to an OR gate means 26 which is located at the blocking signal input of counter 16 and causes a counter blockage whenever both the first and the last shift register positions (and because of the described shift register actuation, also all intermediate register positons) are occupied, either positive, so that the AND gate means 18 delivers a blocking signal, or zero, so that the AND gate means 24 responds.

The counter output is applied to the input A of an auxiliary comparator 28, the other input B of which is connected to a binary-coded reference value setter 30 settable to a variably selectable reference value. If the counter status falls to or below the numerical value selected at the reference value setter 30, the auxiliary comparator 28 delivers an output signal to a bistable circuit means 32, which is set into the enabling position as soon as the first shift register position is occupied positively, but upon occurrence of an auxiliary comparator output signal, is switched by the rising edge thereof into the blocking position and remains therein until the first shift register position is again occupied positively. The output pulse of bistable circuit means 32 switched through in the enable position forms a maximum indicating signal and can be used for calling the respective associated extreme value out of the address memory 8.

In the following, a typical operating cycle of the apparatus will be described briefly:

It is assumed that the analog test signal at the converter 2 is sampled on a rising edge thereof, hence comparator 10 furnishes in the majority of the sampling cycles a positive output signal. Shift register 14, therefore, is occupied positively, increasing from right to left, and accordingly the status in counter 16 increases. Although scatter-related zero output signals of the comparator 10 bring about a reduction of the positively occupied shift register positions and a lowering of the counter status, their dispersive effect will have disappeared after a few sampling cycles. When all shift register positions, e.g., twenty, are occupied positively and counter 16 has run up to a corresponding status (20), counter 16 is blocked for further upward counting via AND gate means 18, and bistable circuit means 32 is switched to the enable position due to the positive occupation of the first shift register position.

During the further sampling of the rising edge of the test signal the number of positively occupied shift register positions and the status of counter 16 remain at the maximum value or at most drop—due to scatter—by a limited numerical value depending on the scatter behavior of the test signal, so that now, until a maximum is reached, a certain number of positively occupied shift register positions and a certain counter status, e.g., fifteen, are no longer fallen short of. It is this counter status given by the scatter characteristic of the data word sequence which is the reference value preselected at the value setter 30.

If the maximum is exceeded, the conditions are reversed, i.e., the zero logic signals predominate at the comparator output 12, more and more shift register positions are occupied (with zero) negatively from left to right, and the counter status of counter 16 falls below its highest status by the number of negatively occupied shift register positions. The scatter-related deviations superposed on this process in the opposite direction remain within the numerical value preselected by adjustment of the reference value setter 30 depending on the scatter behavior of the analog signal, in the case of the example above, 5=highest counter status (20) minus reference value (15). As soon as the counter status falls below the reference value, the auxiliary comparator 28 provides an output signal to the bistable circuit means 32, which is in the enable position, but is switched to the blocking position by the output signal and therefore furnishes at its output a short pulse, e.g., of the length of one operating cycle of the clock generator, indicating presence of a maximum. The associated word can be stored as the maximum value.

During the further scanning of the descending edge, the bistable circuit means 32 remains blocked, so that no display pulse is released and if also the last position of the shift register 14 is occupied with a zero, the counter 16 reaches the lower limit of its counting range (status: 0) and is blocked for further downward counting via AND gate means 24. If after passing through a minimum, an ascending edge of the test signal is scanned again, the described cycle repeats, that is, due to the rising values of the digital word sequence the shift register 14 is occupied positively more and more and the status of counter 16 runs up until also the first shift register position is occupied positively, whereupon counter 16 is blocked for further upward counting and at the same time the bistable circuit means 32 is switched to the enable position to allow passing an output signal of the auxiliary comparator 28.

Within the described structural and operational principle, numerous modifications are possible. Thus, for falling values of the data word sequence, positive instead of zero logic signals of comparator 10 can be entered into the shift register 14, or generally into an addition register, and by the auxiliary comparator 28 output signals can be produced whenever counter 16 exceeds, instead of falling below, a numerical value preselected by adjustment of the reference value setter 30 within the numerical range of the addition register. Selectively or additionally, an arrangement identical with the assembly 14 to 32 can be connected to the second output (shown unoccupied) of the comparator 10, for minimum recognition.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly to be regarded in an illustrative rather than a restrictive sense.

What is claimed is:

1. Apparatus for recognizing relative extrema in a dispersive digital data word sequence, the apparatus comprising:

comparator means having an input for receiving the data word sequence, comparing each word in the sequence with a subsequent word in the sequence, and outputting a logic signal dependent upon the results of the comparing operation;

addition register means coupled to the output of the comparator means, the register means incrementing by one in response to a first state of the logic signal from the comparator means and decrementing by one in response to a second state of the logic signal from the comparator means, the incrementing and decrementing being limited to a certain numerical range; and threshold detector means coupled to an output of the addition register means and responsive to the addition register means for indicating when a numerical value within the certain numerical range in the addition register means has been traversed for recognition of the minimum and maximum extremum.

2. The apparatus recited in claim 1, wherein said addition register means comprises shift register means having a number of shift register positions equal to the size of the limited numerical range, the data content of said shift register means being shifted by a positive comparator output signal in one direction and wherein a cleared shift register position after shifting by a positive comparator output signal is provided with a positive occupation signal, and further being shifted by a negative comparator output signal in the opposite direction and wherein a cleared shift register position after shifting by a negative comparator output signal is provided with a negative occupation signal, the threshold detector means responding when a given number of positively or negatively occupied shift register positions is exceeded.

3. The apparatus recited in claim 2, wherein the threshold detector means comprises counter means for counting a positive comparator output signal upward and a negative comparator output signal downward and which is disabled by equal occupation of the first and last shift register positions of said shift register means, and further comprising auxiliary comparator means coupled to the counter means and for generating, when a count of the counter means exceeds or falls short of a reference value, an output signal for extremum indication.

4. The apparatus recited in claim 3, wherein the auxiliary comparator means coupled to the counter means is presettable to a variable reference value.

5. The apparatus recited in claim 3, wherein the threshold detector means further comprises at its display signal output side bistable circuit means which after passage of a display output signal switches into a locking position and when the numerical range limit in the addition register means is reached, switches to an enabled condition.

6. The apparatus recited in claim 1, wherein the size of the limited numerical range is chosen smaller by a multiple than the number of words between two successive extrema in the data word sequence.

7. The apparatus recited in claim 1 wherein the threshold detector means is presettable to a selectively variable numerical value.

8. The apparatus recited in claim 1, wherein, for maximum extremum recognition, the addition register means is coupled to an output of the comparator means which is activated by a larger word appearing at a first input than a second input of the comparator means, and for minimum extremum recognition, is coupled to an output of the comparator means which is activated by a smaller word appearing at the first input than the second input.

9. The apparatus recited in claim 1, further comprising analog to digital converter means for extremum recognition of analog measured quantities, clock generator means coupled to the converter means and first memory means controlled synchronously with said analog to digital converter means but being controlled shifted in phase, said analog to digital converter means having an output coupled to one input of said comparator means and to said first memory means, and an output of said first memory means being coupled to the other input of said comparator means.

10. The apparatus recited in claim 9, further comprising second memory means coupled to the output of said first memory means.

* * * * *